Patented Dec. 17, 1935

2,024,381

UNITED STATES PATENT OFFICE 2,024,381

ESTERIFICATION OF CELLULOSE

Richard Müller, Heidelberg, Martin Schenck, Mannheim, and Wilhelm Wirbatz and Fritz Müller, Mannheim-Waldhof, Germany, assignors to C. F. Boehringer & Soehne G. m. b. H., Mannheim-Waldhof, Germany No Drawing. Application February 3, 1933, Serial No. 655,141. In Germany February 8, 1932

11 Claims. (Cl. 260—101)

Our invention relates to the production of simple and mixed esters of cellulose and more especially cellulose acetates. It has particular reference to means for effecting the esterification of cellulose in a particularly efficient manner.

As is well known to those skilled in the art, the esterification of cellulose requires the presence of a catalytically active substance, and of the catalysts which are effective in this reaction, sulfuric acid has mostly been used. However, the use of sulfuric acid involves the drawback that this acid enters into combination with the cellulose molecule and can be split off again only with considerable difficulty. In consequence thereof the cellulose esters produced with the aid of sulfuric acid as catalyst have been found to be little stable, since these products, more especially if no far reaching saponification, leading to the so called acetone-soluble esters, is effected, will gradually be decomposed under the influence of the residual sulfuric acid and the artificial products such as silk, films, etc., produced with the aid of these esters, will consequently deteriorate considerably. Notwithstanding this drawback sulfuric acid is being made use of up to this day in most cases as catalyst in the esterification of cellulose, because a great many other catalysts which have hitherto been suggested as substitutes for sulfuric acid, do not result in stable products either or are too little efficient, so that unduly large quantities thereof must be added. Many of these other catalysts also require unduly high reaction temperatures or can be washed out only with difficulty and render the solutions to be prepared from such esters turbid.

We have now found that there exist catalysts, which, while being highly efficient, are free from all the disadvantages mentioned above. They belong to the class of aliphatic sulfo acids, some of which including the methane monosulfo acid $CH_3.SO_3H$ have already been suggested for use in the esterification of cellulose. From these sulfo acids the compounds employed by us are distinguished by their far greater efficiency. These compounds all belong to the class of aliphatic sulfo acids containing, besides the sulfo group, at least one further inorganic acid radical, for instance another sulfo group or a nitro group or halogen or two or more of these groups.

For instance if into the methane monosulfo acid another sulfo group is introduced, there results the methane disulfo acid known under the name of methionic acid $CH_2(SO_3H)_2$. The methionic acid has been found to possess a far greater efficiency than the corresponding monosulfo acid and to be absolutely free from all the drawbacks connected with the use of the other catalysts hitherto suggested for this reaction.

Other compounds belonging to this class of compounds which have been found to be of particular efficiency, are for instance the methane trisulfo acid $CH(SO_3H)_3$, the propane trisulfo acid $CH_2(SO_3H)_3.CH.(SO_3H).CH_2(SO_3H)$ and the halogen-substituted sulfo acids, such as the nitromethane disulfo acid $CH.(NO_2)(SO_3H)_2$, the trichloromethane monosulfo acid $C.Cl_3SO_3H$, all of which are equally distinguished from the nonsubstituted monosulfo acid by the combination with nitro, halogen or other sulfo groups, which greatly enhance the catalytic efficiency of the monosulfo acids.

Since the new catalysts are derivatives of the sulfuric acid, it is surprising to find that even those which contain more than one sulfuric acid radical, thus constituting polybasic acids, do not enter into solid combination with the cellulose molecule, but can be washed out readily and completely. In consequence thereof also the artificial products such as silk, films etc. produced from cellulose esters prepared with one of these acids as catalyst, have proved absolutely stable even in the case where the primary products of esterification were not converted into the so called secondary products (acetone-soluble esters). In contradistinction to the use of sulfuric acid the use of the new catalysts results in the production of cellulose esters which contain the highest percentage of acid which corresponds to the theoretical percentage of a triester.

To which degree the new catalysts are superior to the monosulfo acids previously suggested as catalysts, is shown by the fact that while for instance, when operating at ordinary temperature, about 120% methane monosulfo acid, calculated on the weight of cellulose under treatment, must be used, and when operating at 60° C. about 50%, only a few per cent of one of the substituted sulfo acids have been found to be efficient at ordinary temperature under equal conditions of reaction.

When using halogen-substituted aliphatic sulfo acids such as the trichloro methane monosulfo acid $C.Cl^3.SO_3H$ we have found that as compared with the action of methane monosulfo acid, the threefold period of time was required, if using methane monosulfo acid, for obtaining the same degree of solubility of the acetylation product in methylene chloride, as with the halogen-substituted sulfo acid, although about the twentyfold quantity of this latter acid was used.

We have found that the more inorganic acid radicals are contained in the molecule of the sulfo acid, the higher the efficiency as catalyst and consequently the quantity of sulfo acid containing several halogen and/or sulfo groups may be lower than that of sulfo acids containing only a single halogen, nitro or further sulfo group.

Of the nitro-substituted aliphatic sulfo acids the nitro methane di-sulfo acids $CH(NO_2)(SO_3H)_2$ has been found to be at least the equivalent of methionic acid as catalyst in the esterification of cellulose, but in many cases the presence of the nitro group in the molecule of the catalyst allows operating with still lower quantities than if using methionic acid.

No matter which of these and other substitution products of aliphatic sulfo acids are used as catalysts, the process of esterification for the production of simple or mixed esters or of esters containing still other groups may be varied as usual in the esterification of cellulose. Thus the preliminary treatment of the cellulose described in the following examples may be dispensed with or replaced by other suitable methods and this preliminary treatment as well as the esterification proper may be carried out in the presence of solvents or swelling agents and, if desired, already in the presence of the esterification or other catalysts. In the esterification process, in which one of the new catalysts is employed, the esters may go into solution or may retain the structure of the starting material.

There is no necessity for assisting the action of the new catalysts by adding other catalysts, but such other catalysts may of course be present, more especially such catalysts which as such or owing to their low percentage do not exert any undesirable action either on the cellulose molecule, the cellulose esters and the artificial products made therefrom.

In practising our invention we may for instance proceed as follows:

*Example 1*

100 parts by weight cellulose are subjected to a preliminary treatment according to one of the usual methods, for instance by soaking them during 4 hours in glacial acetic acid at room temperature, whereupon the product thus treated, having been freed from the acid by pressure, is introduced at 15° C. into a mixture of 330 parts acetic anhydride of 90–92% 2000 parts methylene chloride and 6 parts methionic acid of 86%. After intimate mixing the temperature of the mixture is allowed to gradually rise to 30° C. After the lapse of about 4½ hours the cellulose acetate formed in the reaction is precipitated, washed out and dried. It clearly dissolves in methylene chloride, contains the percentage of acetic acid corresponding to a cellulose tri-acetate and is free from sulphur. It can be converted into an artificial product such as silk, films or the like with or without the addition of plastifiers or after having first been converted, in a well known manner, into an acetate possessing other solubility characteristics.

*Example 2*

100 parts cotton subjected to a preliminary treatment such as described with reference to Example 1 are acidylated in a mixture formed of 570 parts acetic anhydride of 67%, 800 parts benzene and 2–3 parts methionic acid of 86%. At a temperature of 20–30° C. the reaction comes to an end after the lapse of about 20 hours. The woolly acetate product freed from the acidylating liquid by pressure is clearly soluble in methylene chloride with or without the addition of alcohol and in a mixture of chloroform and alcohol. On being heated to 270° C. it assumes only a slight yellow colouring, in contradistinction to a product prepared with sulfuric acid as catalyst, which shows a dark brown colour already at 200° C.

*Example 3*

100 parts cotton linters pre-treated as described with reference to Example 1, are entered into a mixture saturated with sulphur dioxide at 15–20° C., consisting of 100 parts acetic anhydride of 90–92%, 315 parts isovaleric acid anhydride, 420 parts benzene, 420 parts ligroin and 2 parts methionic acid of 86%. Under constant stirring of the reaction mass the temperature is allowed to rise first to 25° and at last to about 30° C. After the lapse of about 60 hours the cellulose ester thus obtained is separated from the liquid, rinsed and treated with steam until all smell has disappeared. The product which has a fine woolly form, is soluble in methyl acetate, chloroform and acetone, but insoluble in carbon tetrachloride, dichloro benzene and ligroin. The artificial products produced therefrom possess a high stability.

*Example 4*

100 parts cotton linters subjected to a preliminary treatment as described with reference to Example 1 are acidylated at about 25° C. by means of a mixture containing 570 parts acetic anhydride of 67%, 800 parts benzene, .5 part methionic acid of 86% and .8 part sodium perchlorate. After the lapse of about 10 hours the liquid is removed from the fibrous acidylation product by centrifuging and the product is washed and dried. Its properties resemble those of the product obtained in accordance with Example 2.

*Example 5*

100 parts cellulose which had previously been treated several hours with glacial acetic acid, are subjected to acidylation with a mixture consisting of 420 parts acetic anhydride, 450 parts sulphur dioxide, 840 parts benzene and 2.3 parts trichloro methane sulfo acid of 84%. The cellulose acetate thus formed is treated further as usual and can be converted into an artificial product (silk, film, etc.) either directly or after having been changed into a product having other solubility characteristics or after having been partially saponified.

*Example 6*

100 parts cotton having been subjected to a preliminary treatment as described with reference to Example 5 are treated with a mixture consisting of 420 parts acetic anhydride of 90%, 840 parts benzene, 500 parts sulphur dioxide and 3.5 parts chloro methane disulfo acid. After the lapse of 8 hours the product of acidylation has become soluble in methylene chloride and some alcohol. It is now separated from the liquor by centrifuging and washed, whereupon it can be subjected to further treatment to convert it into an artificial product.

Example 7

100 parts cotton after having been treated with glacial acetic acid for some hours and freed from the liquor by centrifuging, are acidylated at 20-25° C. with a mixture consisting of 420 parts acetic anhydride of 90-92%, 840 parts benzene, 430 parts sulphur dioxide and 1.2 parts nitro methane disulfo acid of 60% (corresponding to .7 part of the 100 per cent acid). After the lapse of 8-10 hours a fibriform cellulose triacetate is obtained, which after having been freed from the adhering liquor by centrifuging, washing and drying is soluble in a mixture of 90 parts by volume methylene chloride and 10 parts alcohol. The product contains 62.5% acetic acid. It can be converted directly into artificial products of all kinds, but it may also previously be converted in a well known manner into a product having other solubility characteristics.

Example 8

100 parts bleached cotton linters, which have preferably been subjected in a well known manner to a preliminary treatment with glacial acetic acid, are acidylated at about 25° C. with the aid of a mixture consisting of 354 parts acetic anhydride of 90-92%, 467 parts glacial acetic acid, 200 parts monochloro acetic acid and 1.67 parts nitro methane disulfo acid of 60% (corresponding to 1 part of the 100 percent acid). The product of acidylation which had gone into solution during the reaction, is precipitated with water and washed and dried in a well known manner. It dissolves clearly in a mixture of 9 parts by volume methylene chloride and 1 part alcohol.

Example 9

100 parts cotton pretreated in a well known manner with acetic acid are subjected to esterification at room temperature with a mixture of 420 parts acetic anhydride of 91%, 840 parts benzene, 450 parts sulphur dioxide and 2 parts propane trisulfo acid of 76%, this acid being dissolved in the mixture by protracted stirring. The product obtained after about 8-12 hours is centrifuged, washed and dried. It clearly dissolves in a mixture of 9 parts by volume methylene chloride and 1 part alcohol.

Various changes may be made in the details disclosed in the foregoing specification without departing from the invention or sacrificing the advantages thereof.

We claim:—

1. The method of producing organic cellulose esters comprising acting on a cellulosic product with an acidylating agent in the presence of a lower aliphatic sulfo acid containing more than one mineral acid radical and being capable of promoting the esterification of cellulose by catalytic action.

2. The method of producing organic cellulose esters comprising acting on a cellulosic product with an acidylating agent in the presence of a lower aliphatic sulfo acid containing more than one sulfo group and being capable of promoting the esterification of cellulose by catalytic action.

3. The method of producing organic cellulose esters comprising acting on a cellulosic product with an acidylating agent in the presence of a lower aliphatic sulfo acid containing besides two sulfo groups also halogen and being capable of promoting the esterification of cellulose by catalytic action.

4. The method of producing organic cellulose esters comprising acting on a cellulosic product with an acidylating agent in the presence of lower aliphatic sulfo acid containing besides two sulfo groups also a nitro group and being capable of promoting the esterification of cellulose by catalytic action.

5. The method of producing organic cellulose esters comprising acting on a cellulosic product with an acidylating agent in the presence of methionic acid.

6. The method of producing organic cellulose esters comprising subjecting a cellulosic product with an acidylating agent in the presence of chloro methane disulfo acid.

7. The method of producing organic cellulose esters comprising acting on a cellulosic product with an acidylating agent in the presence of nitro methane disulfo acid.

8. The method of producing organic cellulose esters comprising subjecting a cellulosic product to a preliminary treatment with an acetic acid product, removing this latter product by pressure and acting on the cellulosic product thus treated with an acidylating agent in the presence of a lower aliphatic sulfo acid containing more than one mineral acid radical and being capable of promoting the esterification of cellulose by catalytic action.

9. The method of producing organic cellulose esters comprising subjecting a cellulosic product in the presence of an aliphatic sulfo acid containing more than one inorganic acid radical to a preliminary treatment with an acetic acid product, removing this latter product by pressure and acting on the cellulosic product thus treated with an acidylating agent in the presence of a lower aliphatic sulfo acid containing more than one mineral acid radical and being capable of promoting the esterification of cellulose by catalytic action.

10. The method of producing organic cellulose esters comprising acting on a cellulosic product with an acidylating agent in the presence of sulphur dioxide and lower aliphatic sulfo acid containing more than one mineral acid radical and being capable of promoting the esterification of cellulose by catalytic action.

11. The method of producing organic cellulose esters comprising subjecting a cellulosic product to a preliminary treatment with an acetic acid product, removing this latter product by pressure and acting on the cellulosic product thus treated with an acidylating agent in the presence of sulphur dioxide and a lower aliphatic sulfo acid containing more than one mineral acid radical and being capable of promoting the esterification of cellulose by catalytic action.

RICHARD MÜLLER.
MARTIN SCHENCK.
WILHELM WIRBATZ.
FRITZ MÜLLER.